Sept. 8, 1964　　　J. W. BORGER ETAL　　　3,147,868
CONTAINER TRANSFER ARRANGEMENT AND TRANSFER DEVICES THEREFOR
Filed April 21, 1961　　　　　　　　　　　　　　　9 Sheets-Sheet 1

INVENTORS
JACK W. BORGER,
MARCELLO DE PAOLI AND
BY RALPH B. BERGSTRAND

*Cromwell, Greist and Warden*
ATTORNEYS

United States Patent Office

3,147,868
Patented Sept. 8, 1964

3,147,868
CONTAINER TRANSFER ARRANGEMENT AND
TRANSFER DEVICES THEREFOR
Jack W. Borger, Calumet City, Marcello De Paoli, Chicago, and Ralph B. Bergstrand, Homewood, Ill., assignors to Pullman Incorporated, Chicago, Ill., a corporation of Delaware
Filed Apr. 21, 1961, Ser. No. 104,650
4 Claims. (Cl. 214—38)

The invention relates to a new and improved container transfer arrangement and to new and improved container transfer devices particularly adapted for use with railway cars.

Piggyback lading operations have expanded greatly within the last few years. The primary reason for the growing success of piggyback lading operations resides in the elmination of substantial time-consuming labor involved in the transfer of individual pieces of freight to and from short haul trucks and long haul railroad freight cars. The original basic concept of piggyback operation evolved with the transportation of truck trailer units either with or without the truck trailer chassis. In this regard the trailer in its loaded condition is loaded onto a suitably designed flat car or the like and staked thereto for transporting purposes. At its designation, the trailer is merely unloaded from the car by a truck tractor and the contents thereof, untouched since initial loading in the trailer body, are delivered to the destination and there unloaded for the first time.

With the advantages of piggyback operations becoming apparent, many different types of freight containers have been proposed for use in piggyback hauling operations. These containers are designed for transferring to and from a truck trailer chassis and a railroad flat car. In line with the concept of the present invention, it has been realized that piggyback operations can be used with any type of freight even including railway express freight which has been to date handled on a piecemeal basis and hauled in special express agency closed cars. The present invention deals with the use of a suitable less expensive open deck flat car adapted for piggyback operation with a plurality of freight containers. These containers are of a size which may be readily handled in passenger depots and are designed for loading with freight parcels of the type normally handled by railway express shippers. In this respect the piggyback container car replaces the standard railway express car in the make-up of a passenger train as well as express freight trains. The cars are designed for loading and unloading in freight yards and passenger depots.

It is an object of the invention to provide a new and improved lading transfer arrangement for use with a freight vehicle in handling of containers or the like, the arrangement being especially adapted for use in the loading, unloading and transferring of containers relative to a piggyback railroad cars, the arrangement providing for savings in time and labor and being adapted for use in freight yards and passenger depots.

A further object is to provide a lading transfer arrangement involving new and improved devices forming a part thereof which are adapted for efficient utilization in the transfer of containers or the like between a railway car or other suitable freight vehicle and a container transfer device, the arrangement involving unique elements which function on the car as well as cooperating elements which function on the transfer device to provide a bridging arrangement between the car and device for lading transfer, the device being designed to support lading for movement to and from the car.

Still another object is to provide a new and improved transfer device adapted for use with a railway car, the device comprising uniquely operating means providing for efficient handling of a container during loading and unloading of the container as well as during transfer thereof in freight yard and passenger depot facilities.

A further object is to provide a new and improved railway car for use in piggyback lading operation, the car comprising means forming a part thereof adapted for cooperative function with a suitable lading transfer device during the loading and unloading of lading relative to the car.

Other objects not specifically set forth will become apparent from the following detailed description of the invention made in conjunction with the accompanying drawings wherein:

FIG. 3 is an enlarged fragmentary transverse section of the arrangement taken generally along line 3—3 in FIG. 2 and illustrating the loading end of the transfer device in fragmentary end elevation;

Figure 1:
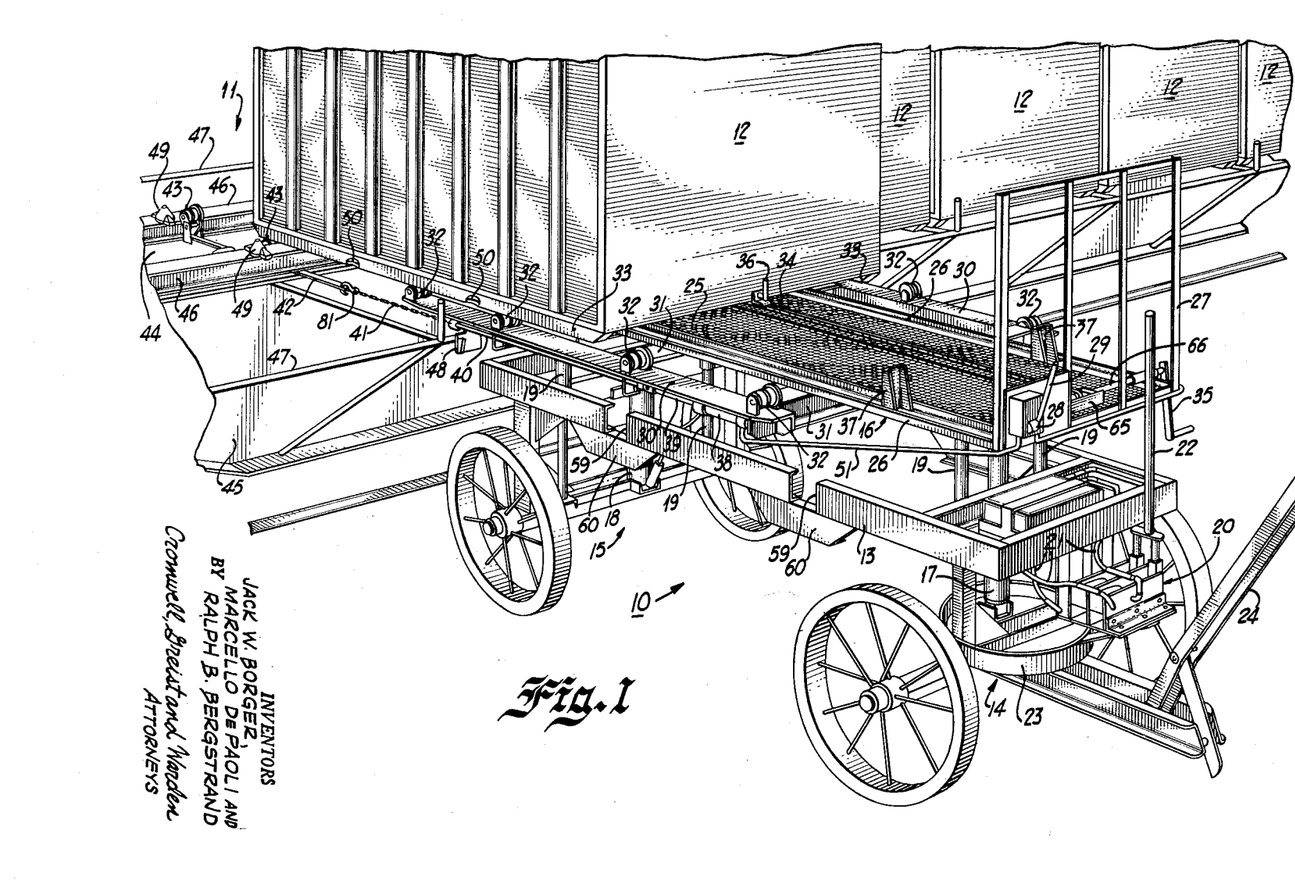
FIG. 1 is a fragmentary perspective of one form of lading transfer arrangement and lading transfer device forming a part of the present invention, this view illustrating operative use of the arrangement.

FIG. 1 illustrates an embodiment of a container transfer device 10 in operative association with a piggyback railway car 11 during the transfer of a container 12 therebetween. The container transfer device 10 includes basic structural features which are known in conjunction with existing hydraulic lift freight wagons or trucks. The basic design involves the provision of a base frame 13 of rectangular shape suitably supported at opposite ends by wheel assemblies 14 and 15. A support platform structure 16 is mounted on the wheel assemblies 14 and 15 through hydraulic lift means 17 and 18 combined with telescoping rod means 19 which function to stabilize the platform structure 16 during vertical movement thereof relative to the base frame 13. A known type of hydraulic pump unit 20 is mounted on the front end of the device 10 and is suitably connected through flexible hydraulic fluid lines 21 to the lift means 17 and 18. Rocking pumping action of the handle 22 results in vertical operation of the platform structure 16. The front wheel assembly 14 is provided with a fifth wheel unit 23 to which is attached a draft handle assembly 24 for movement of the device 10 during use thereof. The general structure described is basically conventional bearing in mind that the device 10 is intended for use in loading and unloading lading as well as transfer of lading in a freight or passenger depot.

The vertically movable support platform 16 includes a centrally continuous waffled plate 25 having attached thereto along opposite side margins thereof a pair of longitudinally extending channel frame members 26. The operating end of the support platform 16 is provided with an upstanding guard frame 27 which mounts thereon a hydraulic pump unit 28 provided with an operating handle 29. Outboard of the side frame members 26 are a pair of longitudinal extending ramps 30 which are supported and structurally tied into the support platform 16 by transverse frame members 31. Each of the ramps 30 have suitably mounted thereon a series of longitudinally spaced roller assemblies 32 adapted to support the container 12 thereon by engagement with the bottom surfaces of depending support frame members 33 formed on the container 12. The area of the bottom surface of the container 12 between the frame members 33 defines a recessed portion which extends over the supporting platform 16.

The support platform 16 further includes a container attachment arrangement involving the use of an endless chain 34 extending longitudinally of the platform 16 and driven at one end through drive means including an operating handle 35. A container locking member 36 is attached to the chain 34 and is detachably connected to a suitable element on the container 12 to provide for movement of the container 12 longitudinally of the transfer device 10 upon operation of the handle means 35. Vertically directed stop members 37 are carried on the side frame members 26 and provide abutment means to limit movement of the container 12 onto the transfer device 10.

Each ramp 30 has mounted therebelow a hydraulic cylinder 38 including a piston 39 attached through an operating rod 40 to a chain 41. The outermost end of each chain 41 is detachably connected to an operating lever 42 of a pair of roller assemblies 43 mounted on the railway car 10 and providing thereon a continuation of the ramp means forming a part of the container transfer device 10. The railway car 11 may be of any suitable design such as including an open deck portion 44 to receive a plurality of containers 12 thereon in supported relation. The particular car illustrated is known as a "skeletal" piggyback flat car of the type disclosed in the copending application Serial No. 21,331, filed April 11, 1960. Generally, this car includes a center sill structure 45 of narrow width having a flat top surface portion on which is mounted a pair of transversely spaced, longitudinally extending rail members 46. Each rail member is in the form of an I-beam and the top surfaces thereof define supporting surfaces for the containers 12. The railway car further includes outrigger guard rail assemblies 47 over which the container transfer device 10 operates. The outboard ramps 30 of the device 10 include depending abutment plates 48 near their outer ends which engage the guard rail structure 47 for proper positioning of the device 10 during container loading and unloading. The rail members 46 of the car 11 include container locking members 49 which are designed to releasably engage locking means 50 formed along the depending frame members 33 of each container 12. The hydraulic cylinders 38 are connected to the pump 28 through flexible lines 51.

The railway car 11 described includes suitable cushioning means to protect the lading from buff and draft shocks during operation of the car. Such cushioning means may be in the form of at least one hydraulic cylinder interconnecting the rail members 46 to the center sill 45 and permitting movement of the rail members with containers 12 attached thereto relative to the center sill. Otherwise, a special long travel coupling arrangement of the type disclosed in the aforementioned copending application may be used thus permitting fixed mounting of the rail members 46 on the center sill 45.

Figures 5, 6:
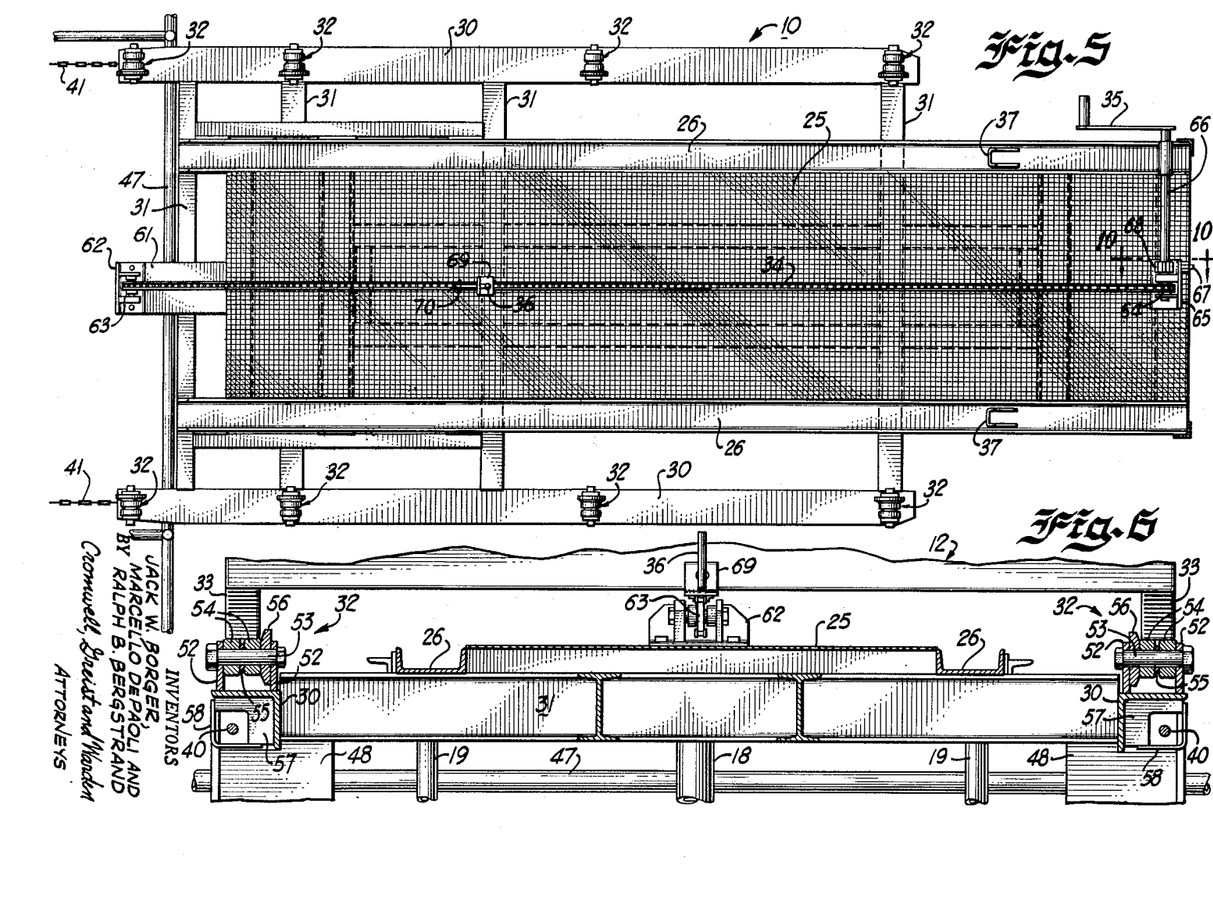
FIG. 5 is a fragmentary plan view of the lading transfer device as viewed generally along line 5—5 in FIG. 2.
FIG. 6 is an enlarged fragmentary transverse section of the platform portion of the transfer device taken generally along line 6—6 in FIG. 2.

FIGS. 2, 3, 5 and 6 illustrate the important details of the structural features of the support platform 16 of the container transfer device 10. The ramps 30 are in the form of L-shaped beams which open downwardly and outwardly. As best shown in FIGS. 3 and 6, the roller assemblies 32 mounted on the top flat surface of the ramps 30 each include a pair of upstanding mounting ears 52 which receive therethrough suitable pin means 53 on which a pair of relatively wide rollers 54 are rotatably mounted. A spacer 55 is mounted between the rollers 54. A larger diameter, relatively thin roller 56 is mounted on the pin 53 inwardly of the rollers 54 and is beveled along its exposed inner surface portion adjacent the depending frame members 33 of the container 12. The roller 56 functions as a guide roller to maintain the container 12 in proper operative position along the associated ramp 30.

Figure 2:
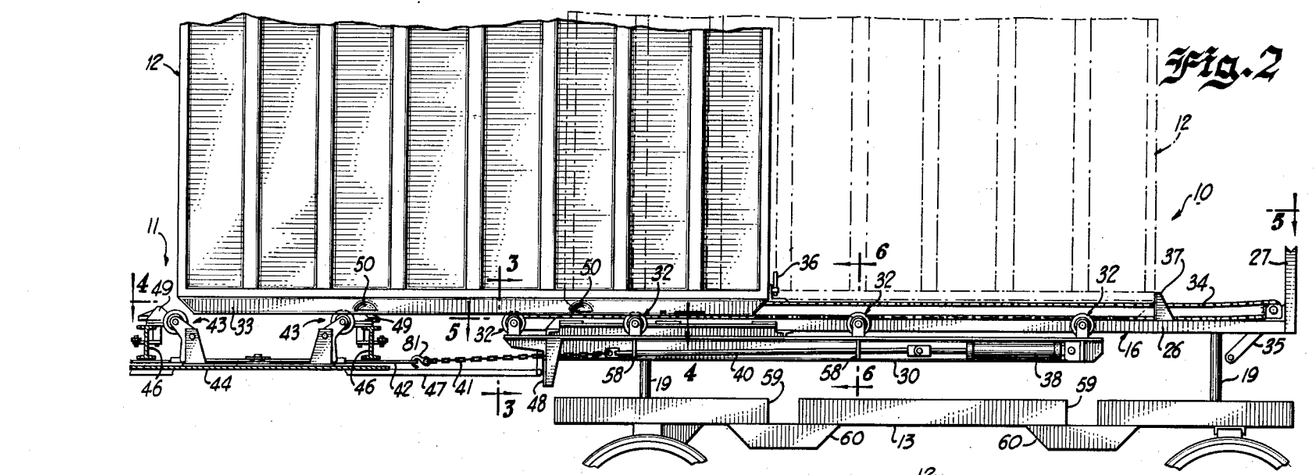
FIG. 2 is a fragmentary side elevation of the lading transfer arrangement illustrated in FIG. 1.

The bottom inner surface portion of each ramp 30 is provided with a plurality of spaced reinforcing plate portions 57 which are provided with outer cut-out areas through which the connecting rod 40 or chain 41 extend. Strap means 58 are attached to the reinforcing plate 57 and extend downwardly and inwardly around the rod 40 or chain 41 to enclose the same. As best shown in FIG. 2, the base frame 13 of the container transfer device along the side thereof is provided with groove-like cut-out portions 59 adapted to receive therein the outer edge portions of the straps 58 when the support platform 16 is lowered to its fullest extent. Frame pieces bridge the side frame portions below the cut-out portions 59 to provide adequate strength and continuity to the base frame 13.

FIG. 3 illustrates the outer end depending stop plates 48 as being suitably secured to the outer end transverse frame member 31 of the support platform 16. The stop plates 48 extend downwardly and outwardly below the ramps 30 and accommodate operation of the chains 41 therethrough.

Figures 4, 10:
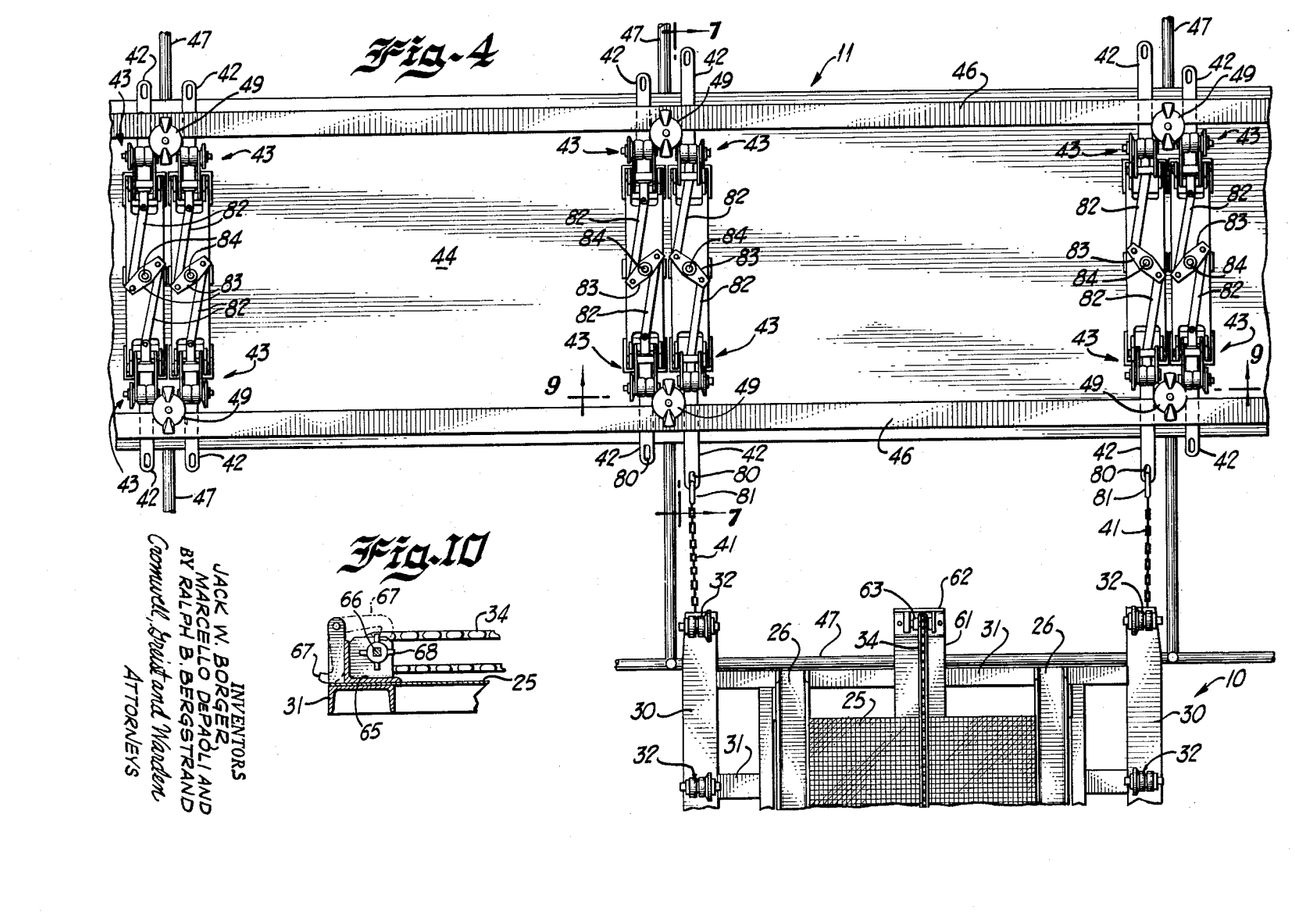
FIG. 4 is a fragmentary plan view of a portion of the railway car and the loading end of the transfer device as viewed generally along line 4—4 in FIG. 2.
FIG. 10 is an enlarged fragmentary section of a lock mechanism forming a part of operating means of the lading transfer device, this view being taken generally along line 10—10 in FIG. 5.

As best shown in FIG. 5, the outer end transverse frame member 31 defining the loading end of the container transfer device 19 has centrally mounted thereon an outwardly projecting beam 61 which has suitably attached thereto at its outermost end an upstanding bracket 62 (also see FIG. 3). Mounted on the bracket is a sprocket assembly 63 which anchors the loading end of the continuous chain 34. The sprocket assembly 63 functions as an idler and the opposite end of the chain is attached to a driven sprocket assembly 64 mounted on a bracket 65 carried at the operating end of the device 10. The sprocket assembly 64 is driven by a shaft 66 to which the operating handle 35 is suitably attached. FIG. 10 illustrates a lock arrangement which includes a pivotally mounted latch member 67 suitably carried by the bracket 65 and adapted to engage projecting locking fingers or ribs 68 carried on the operating shaft 66. FIG. 10 illustrates use of the locking member 67 in broken lines to hold the shaft 66 against rotation in a direction which will permit movement of a container away from the stop plates 37 carried on the support platform 16. In other words, once a container 12 is fully supported on the transfer device 10, the lock assembly of FIG. 10 is operated to hold the container in abutment with the stop plates 37 and prevent shifting thereof during movement of the transfer device.

Figure 7:
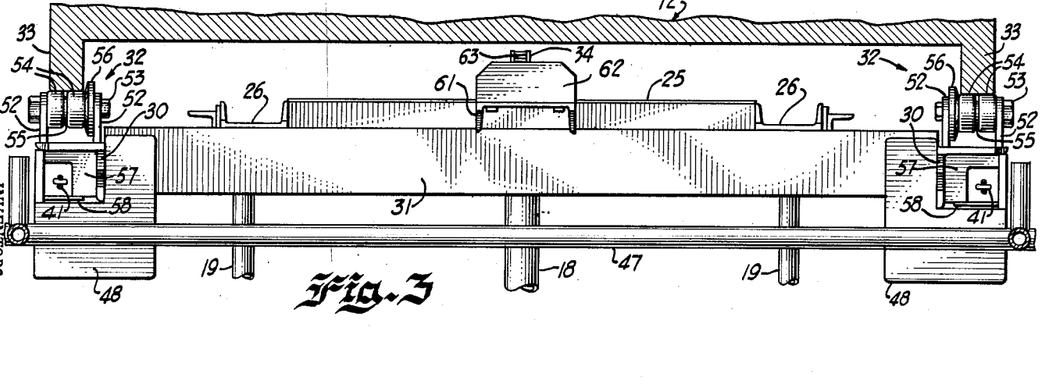
FIG. 7 is an enlarged fragmentary transverse section of a special roller assembly forming a part of the arrangement of the invention and mounted on a railway car, this view being taken generally along line 7—7 in FIG. 4.

FIGS. 5 and 7 best illustrate the container locking arrangement 36. This arrangement includes a flange member 69 fixed on the chain 34 and carrying a rotatable locking pin 36 the outermost end of which is provided with a transverse pin 70 which is received in a suitable opening in the container 12 and upon rotation locks the container for movement with the chain 34. With this arrangement, rotation of the operating handle 35 results in movement of a container longitudinally of the transfer device 10 during loading or unloading of the container. While manual operating means have been described, it will be understood that motor driven means may be used during container transfer for operation of the container attaching arrangement.

With regard to the ramp members consisting of the roller assemblies 43 mounted on the car 11 as previously described, FIG. 4 generally illustrates the arrangement of these assemblies in paired relation extending transversely between the rail members 46. The assemblies are mounted on the top flat surface 44 of the center sill 45 of the car and in their inoperative positions are located below the top surfaces of the rail members to permit resting of the containers thereon. Each rail member is raised from the top surface 44 of the center sill 45 by supporting means not shown. The roller assemblies are arranged to engage the depending bottom frame members 33 of the containers 12 to lift the containers for unloading thereof. Intermediate adjacent pairs of roller assemblies 43 are positioned the container locking means 49 which in the specific form illustrated do not form a part of the present invention, it being understood that any suitable container locking means may be utilized.

Referring to FIGS. 4 and 7–9, each roller assembly 43 includes a base plate 71 fixed on the center sill 45 and carrying upwardly projecting spaced ears 72 carrying a transverse pivot pin 73 therebetween. The pin 73 has mounted thereon a pair of spaced angled levers 74 which at their uppermost end mount therebetween a pin 75. This pin has received thereon a pair of rollers 76 adapted to engage the bottom edge of the depending frame members 33 of a container 12. A larger guide roller 79 of the type previously described is mounted inwardly of the rollers 76. The lowermost ends of the angled levers 74 have received therethrough a pivot pin 77 which extends through a clevis 78 having a lever 42 fixed thereto and extending outwardly under the adjacent rail member 46 in projecting relation along a side of the car 11. The outer end of the lever 42 is provided with a slot-like aperture 80 (FIG. 4) in which the hook 81 of a chain 41 may be received. The clevis 78 has suitably pivotally attached thereto inwardly of the adjacent rail member 46 a lever 82 which at its innermost end is pivotally attached to one end of a clevis-type rocker member 83. This rocker member is centrally pivotally attached to the center sill 45 by a pin 84. The rocker lever unit is suitably mounted on a base plate 85 attached to the center sill 45. The opposite projecting clevis-type portion of the rocker lever 83 is pin connected to the innermost end of the lever 82 of a corresponding roller assembly 43. Thus a complete ramp-defining roller unit includes a pair of cooperatively functioning roller assemblies 43 of like design which may be simultaneously operated from either side of the car 11.

Figure 8:
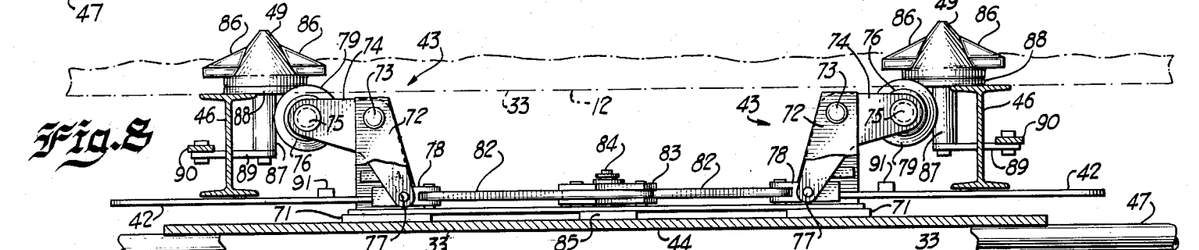
FIG. 8 is a view similar to FIG. 7 illustrating operative functioning of the special roller assembly.
Figure 9:
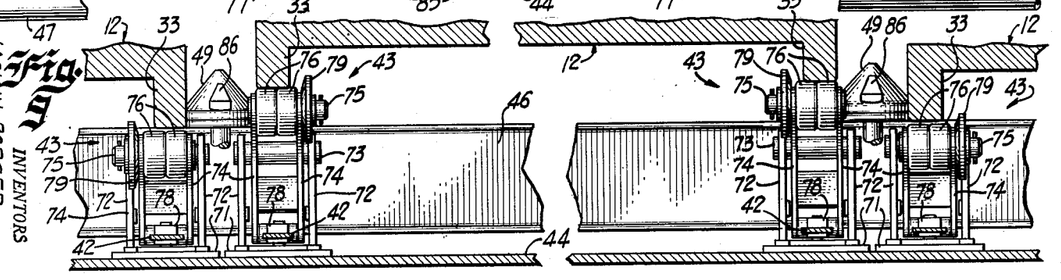
FIG. 9 is an enlarged fragmentary longitudinal section of a pair of roller assemblies on the railway car taken generally along line 9—9 in FIG. 4.

The container lock members 49 as best shown in FIGS. 7 and 8 are in the form of pivotal cones provided with oppositely projecting locking tongues 86. Each cone is provided with a depending spindle portion 87 which is journaled in a supporting member 88 suitably fixed to a top surface portion of a supporting rail member 46. The bottom end of the spindle 87 is fixed to a lever 89 extending outwardly through a suitable opening in the center portion of the rail member 46. The outer end of the lever is pivotally attached to an operating lever 90 which extends the full length of the rail member 46 and also has pivotally attached thereto other levers 89 of the longitudinally spaced cones 49. Upon movement of the operating levers 90 of the cone assemblies longitudinally of the rail members, the individual locking cones 49 rotate to a suitable extent to provide for locking insertion of the oppositely directed tongues 86 into aligned locking recesses 50 of adjacent containers 12. Similarly, to provide for container unlocking the operating levers 90 are moved in the opposite direction to pivot the cones into the positions illustrated in FIGS. 7–9.

In describing the operation of the lading transfer arrangement of the present invention, reference will be made to the transfer of a container 12 from the railway car 11 onto the container transfer device 10. The transfer device 10 is rolled into proper position along the side of the car 11 and the hydraulic pump 20 is operated to raise the support platform 16 to a height to permit clearance of the projecting ends of the ramps 30 and the flange 61 over the guard bar structure 47. The device 10 is moved toward the car 11 until the stop plates 48 contact the guard bar structure 47 as particularly shown in FIG. 2. The hooks 81 of the chains 41 are inserted in the slots 80 of the operating levers 42 of the spaced pairs of roller assemblies 43 immediately under the container 12 to be transferred. The hydraulic pump 28 is operated resulting in a retraction of the pistons 39 of the cylinders 38 and movement of the connecting rods 40 and chains 41 toward the operating end of the device 10. The container locking assembly has been operated to release the containers for unloading thereof and outward movement of the operating levers 42 of the roller assemblies 43 results in upward movement of the rollers 76 thereof into engagement with the bottom surfaces of the depending side frames 33 of the container. The linkages interconnecting the roller assemblies 43 in the manner previously described operate to lift the rollers 76 from the recessed position shown in FIG. 8 into the raised position shown in FIG. 7. In this manner the container 12 is raised to the level of the roller assemblies 32 of the transfer device 10.

The container attaching element 36 is suitably connected to the container 12 and the chain operating handle 35 is rotated in a direction to cause the container 12 to move along the horizontally aligned roller assemblies onto the container transfer device 10. During this operation the continuous pulling action exerted by the hydraulic cylinders 38 provide for continuous engagement and fixed positioning of the transfer device 10 with the car 11. Complete stabilization is affected and the container 12 moves smoothly onto the transfer device 10. Referring to FIG. 7, upward movement of the roller assemblies 43 is limited by stop means 91 fixed on the levers 42 for abutment with the inner edge of adjacent rail members 46.

The container 12 is moved onto the transfer device 10 until it abuts the stop plates 37 as shown in FIG. 2. At this point of the operation the transfer device 10 fully supports the container 12 and the hydraulic cylinders 38 are released to permit disconnection of the chains 41 from the levers 42. The weight of the rollers 76 of the roller assemblies 43 is sufficient to provide for a return of these assemblies to their inoperative recessed positions. The support platform 16 may then be lowered by venting the hydraulic cylinders 17 and 18 until the same is directly supported by the base frame 13. The container transfer device 10 is then ready for mobile operation with the container thereon to any suitable location. During mobile operation of the container transfer device 10 the lock assembly of FIG. 10 is used to prevent shifting of the container 12 thereon. Loading operation of a container 12 from the device 10 onto the car 11 is carried out in the same manner described above with the exception that the operating handle 35 is rotated in the opposite direction to push the container 12 onto the car 11.

FIGS. 11–19 illustrate a further embodiment of a lading transfer arrangement forming a part of the present invention. This arrangement basically makes use of the principles of operation described above and in many instances the elements used are of like construction and arrangement. Therefore, like reference numerals are used in identifying these elements.

Figure 11:
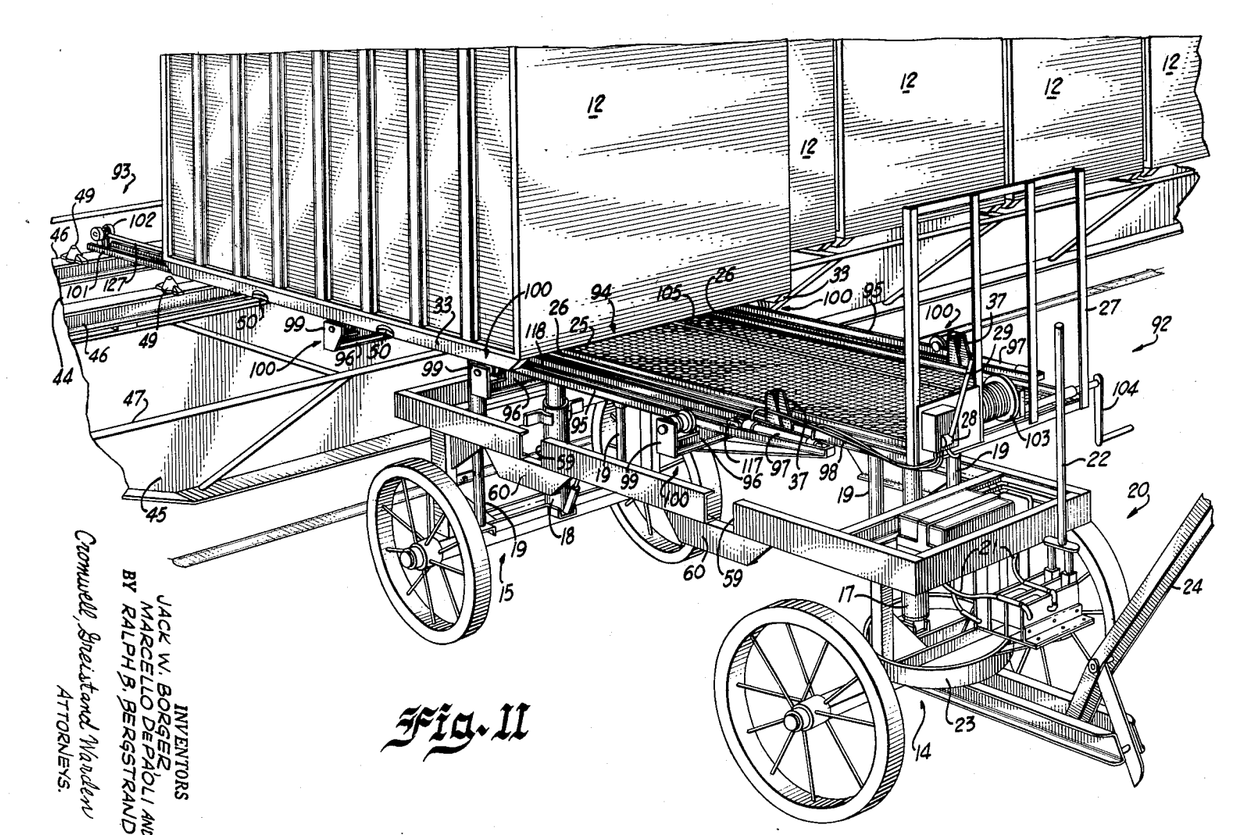
FIG. 11 is a view similar to FIG. 1 illustrating a modified form of lading transfer arrangement involving the use of a special lading transfer device, this view illustrating operative use of the arrangement and device.

Referring particularly to FIG. 11, the arrangement includes a container transfer device 92 conforming generally to the device 10 previously described. A piggyback railway car 93 is also of the same general construction but in the transfer arrangement of FIG. 11 the transfer ramp members and roller assemblies are all carried by the transfer device 92. The modifications occurring in the vertically movable container support platform identified generally by the numeral 94 includes the provision of a trough-like member 95 extending longitudinally along each side of the support platform 94 outwardly of the frame members 26 and being supported on the top surfaces of transverse frame members 96. The end of each trough-like member 95 adjacent the operating end of the device 92 mounts therein a hydraulic cylinder 97 attached by flexible tubing 98 to the hydraulic pump 28. The transverse frame members 96 project outwardly of the trough-like members 95 and at their outermost ends are provided with vertical plate members 99 which cooperate with adjacent edge portions of the trough-like members 95 to mount therebetween roller assemblies 100.

Extending outwardly from the loading end of the transfer device 92 and projecting over the car 93 in resting engagement on the top surfaces of the rail members 46 thereof are a pair of extensible ramp members 101 which are suitably connected to the trough-like members 95 in a manner to be described. The ramp members 101 extend through the bottom recess of a container 12 between the depending bottom frame members 33 and are provided with vertically acting roller assemblies 102 which function to lift a container 12 out of supported engagement with the rail members 46 and permit transfer thereof to and from the device 92. The container chain drive arrangement previously described may be used for movement of a container 12 to and from a car 93. As shown in FIG. 11, a winch and cable arrangement may also be used. The winch 103 is mounted at the operating end of the device 92 and is provided with operating handle means 104. The cable 105 is provided at the end thereof with a suitable hook means 106 which detachably engages a portion of the container 12 through any suitable arrangement. It will be appreciated that this arrangement provides for movement of the container 12 from the car 93 onto the transfer device 92 but does not provide for loading of a container from the device 92 onto the car. However, the various roller assemblies materially reduce the problem of moving a fully loaded container and it has been found that containers of substantial weight can be readily moved by hand when the same are roller supported.

Figure 13:
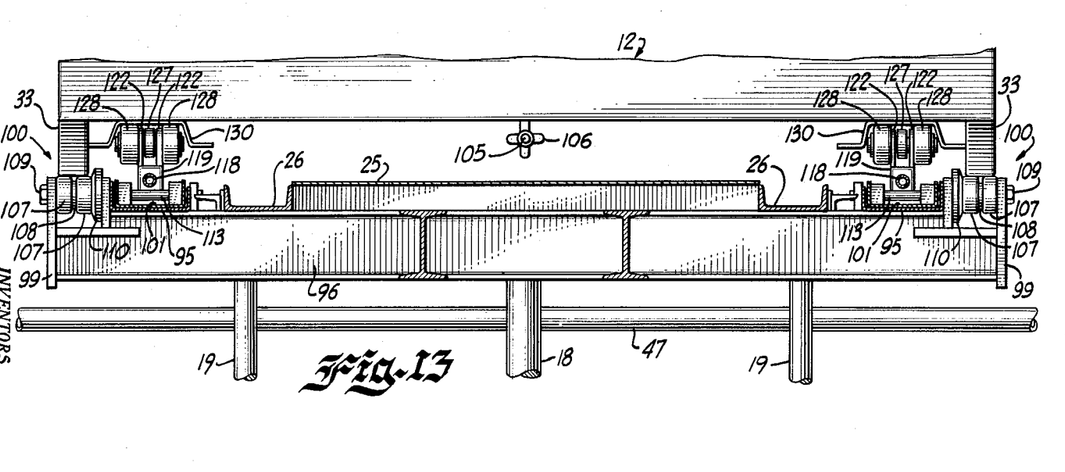
FIG. 13 is an enlarged fragmentary transverse section of the arrangement taken generally along line 13—13 in FIG. 12.
Figure 14:
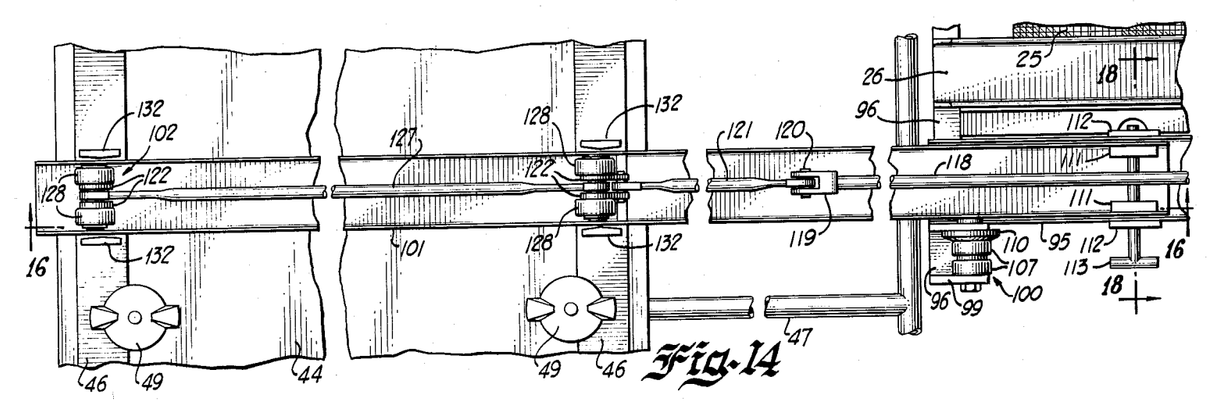
FIG. 14 is an enlarged fragmentary plan view of a portion of one of the ramp members of the modified lading transfer device as viewed along line 14—14 of FIG. 12.
Figure 15:
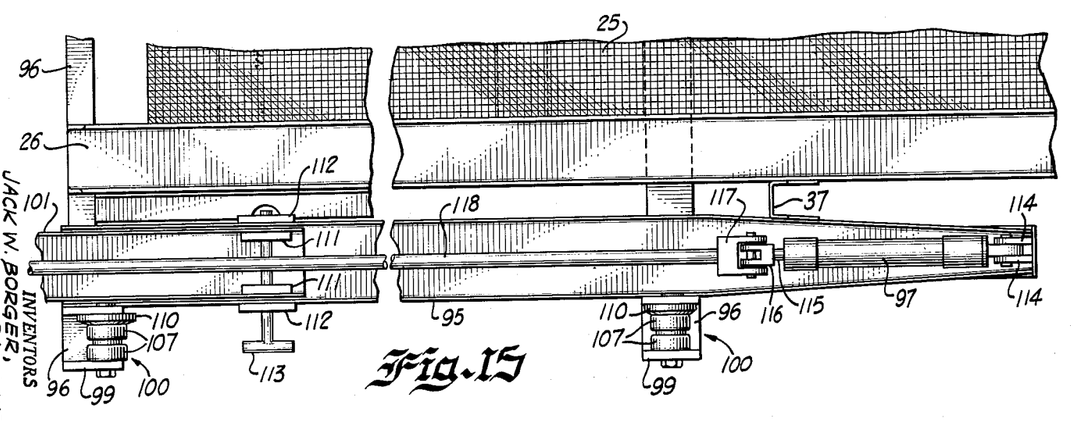
FIG. 15 is a view similar to FIG. 14 of the remainder of the ramp member as viewed along line 15—15 in FIG. 12.

As best shown in FIGS. 13–15, the outboard roller assemblies 100 supported by the transverse frame members 96 each include a pair of relatively wide rollers 107 spaced by an intermediate bearing 108 and rotatably mounted on a suitable pin 109. Inwardly of the rollers 107 is a radially enlarged beveled guide roller 110 which acts with the depending frame members 33 of a container 12 to control positioning thereof during transfer of the container. Referring particularly to FIGS. 14 and 15, each extensible ramp member 101 is in the form of an upwardly opening trough which is of a width permitting telescoping thereof in an associated trough-like member 95. The attaching end portion of the ramp member 101 is provided with inwardly positioned reinforcing members 111 (see also FIG. 18) and the outer surface portions adjacent the outer end of the trough-like member 95 are also provided with corresponding reinforcing members 112. Suitable aligned apertures extend through the nested ramp members and reinforcing members and a transverse locking pin 113 is inserted therethrough to interconnect the same. The hydraulic cylinder 97 mounted in a trough-like member 95 has the cylinder end thereof pivotally attached between spaced ears 114 fixed to the end of the trough-like member. The piston 115 is provided with a clevis 116 which is pin connected to a larger clevis 117 fixed on an end of a connecting or pull rod 118 which extends along the interior of the trough-like member 95.

Figure 16:
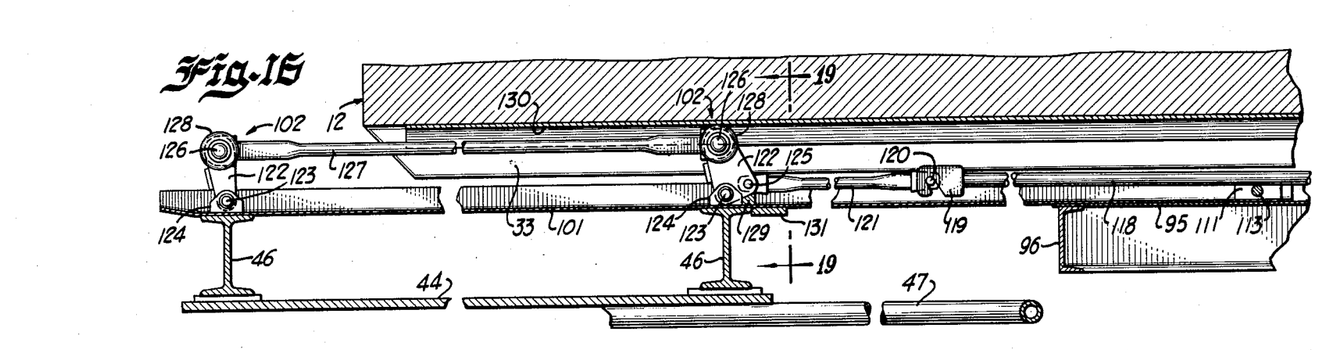
FIG. 16 is a fragmentary side elevation of the portion of the ramp member of FIG. 14 as viewed along line 16—16 therein.
Figure 19:
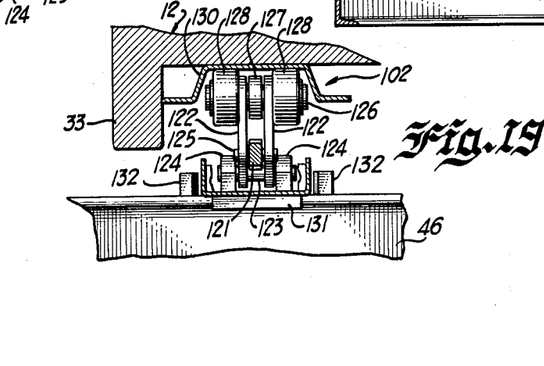
FIG. 19 is a fragmentary section taken generally along line 19—19 in FIG. 16.

As best shown in FIGS. 14 and 16, the outermost end of the connecting rod 118 is provided with a clevis-type hook member 119 which detachably engages a transverse pin 120 mounted in the adjacent end of a roller assembly operating rod 121. This rod is carried by the extensible ramp member 101 and is connected to a pair of roller assemblies 102 therein. As best shown in FIG. 19, each roller assembly 102 includes a pair of rocker plates 122 mounted at the base thereof on a pin 123 which extends through apertured spaced ears 124 fixedly mounted on the ramp member 101. The adjacent end of the operating rod 121 is pivotally attached by a pin 125 in spaced relation to the pin 123. The upper ends of rocker plates 122 receive a pin 126 therethrough on which is mounted the end of a connecting rod 127 and outboard rollers 128.

Figure 17:
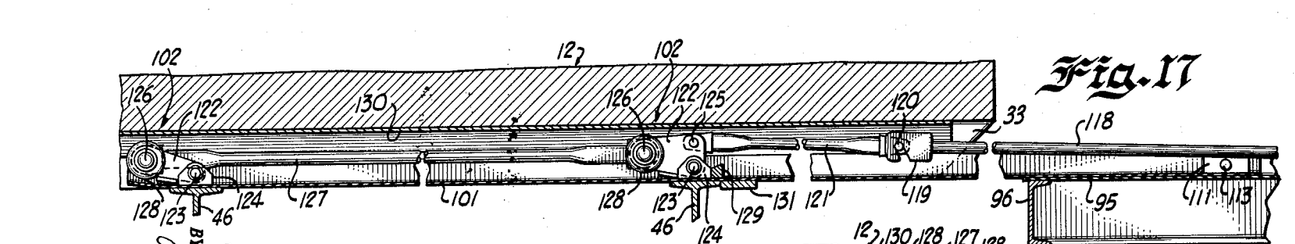
FIG. 17 is a view similar to FIG. 16 illustrating operative functioning of the ramp member.
Figure 18:
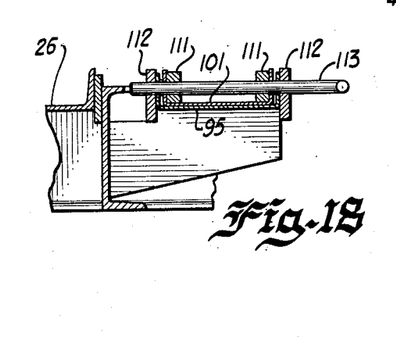
FIG. 18 is a fragmentary section taken generally along line 18—18 in FIG. 14.

Referring particularly to FIGS. 14 and 16, the connecting rod 127 extends in to similar operating connection with the outermost roller assembly 102 which is also constructed in basically the same manner as the roller assembly 102 of FIG. 19. Operation of the roller assemblies 102 is best shown in FIGS. 16 and 17. Operation of the hydraulic cylinder 97 resulting in retraction of the piston 115 causes the connecting rod 118 to pull the operating rod 121 toward the operating end of the transfer device 92. This pulling action results in a pivoting of the interconnected roller assemblies about their pins 123 into a raised position as shown in FIG. 16. The extent to which the roller assemblies 102 are pivoted upwardly is limited by a stop bar 129 extending across the ramp member 102 along an end of the innermost roller assembly 102. The roller assemblies are arranged for downward pivoting into inoperative positions as shown in FIG. 17 by reason of their own weight when the hydraulic cylinder 97 is released.

As best shown in FIG. 19 the bottom surface of the container 12 may be provided with an inverted trough-like track member 130 just inwardly of the depending frame member 33 to receive the roller assemblies 102 therein. This track member provides a means for proper positioning of the extensible ramp members 101 prior to container transfer operation.

Figure 12:
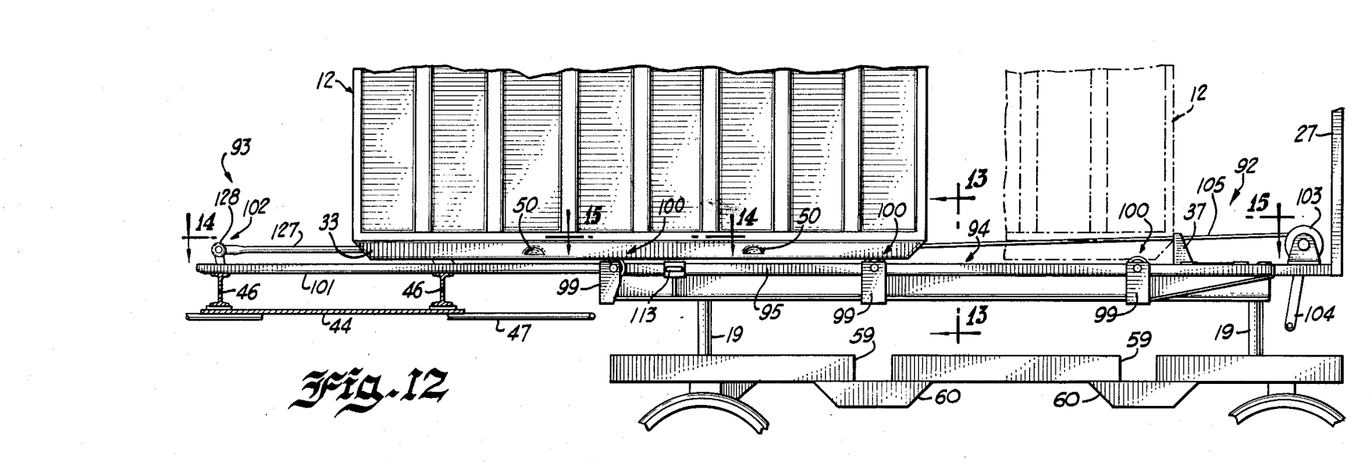
FIG. 12 is a fragmentary side elevation of the lading transfer arrangement illustrated in FIG. 11.

In the operation of the transfer arrangement of FIG. 11, the device 92 is moved into association with the side of the car 93 adjacent a container 12 and the extensible ramp members 101 are suitably attached to the trough-like members 95 by use of the pins 113. The ramp members 101 are inserted between the container 12 and the top surfaces of the rail members 46 of the car 93 directly below the guide tracks 130. The transfer device 92 is moved inwardly toward the car to an extent that abutment occurs between transverse stop members 131 (see FIG. 16) and an adjacent edge of a rail member 46. Proper positioning of the ramp members 101 may be aided by the provision of guide flanges 132 mounted on the rail members 46. The hydraulic pump 28 is operated to raise the roller assemblies 102 in the manner previously described and the container 12 is thus lifted from engagement with the top surfaces of the rail members 46. The container 12 may then be moved along the roller assemblies 102 and onto the outboard roller assemblies 100 of the device 92 an eventually into abutment with the stop plates 37 as shown in FIG. 12. The extensible ramp members 101 may then be readily disconnected and the device 92 operated on its wheel assemblies to transfer the container 12.

Obviously certain modifications and variations of the invention as hereinbefore set forth may be made without departing from the spirit and scope thereof, and therefore only such limitations should be imposed as are indicated in the appended claims.

We claim:

1. In combination, a pair of vehicles each adapted for transportation of container-type lading, said vehicles including a lading transfer arrangement for controlled movement of lading between said vehicles, said lading transfer arrangement comprising lading engagement and movement means and a pair of separate series of longitudinally aligned rollers for lading support and movement over and between said vehicles, one of said roller series and said lading engagement and movement means being carried by one of said vehicles with said roller series projecting vertically above a top surface portion of said one vehicle, the other of said roller series being positioned along a lading supporting surface of the other of said vehicles and supported by said other vehicle and extending thereon as a separable independent series but in the operative combination of said vehicles constituting a continuation of said first roller series, said other roller series including a plurality of vertically pivotal roller assemblies arranged for movement into and out of vertically projecting relation relative to the lading supporting surface of said other vehicle, operating means for said other roller series carried by said one vehicle, and means detachably interconnecting said operating means and each of the roller assemblies of said other roller series for raising and lowering the same as controlled from said one vehicle, said operating means and interconnecting means being operable in a direction toward said one vehicle to raise and forcibly tie in said other roller series with said one roller series during lading transfer.

2. The combination of claim 1 wherein said other roller series constitutes a permanent part of said other vehicle, said interconnecting means including lever means projecting from said other vehicle in detachable interconnection with said operating means.

3. The combination of claim 1 wherein said other roller series constitutes a permanent part of said other vehicle, said interconnecting means including lever means projecting from said other vehicle in detachable interconnection with said operating means, said lever means being mounted for movement toward said one vehicle to raise said other roller series into operative position, the movement of said lever means by said operating means drawing said vehicles toward one another during raising of said other roller series.

4. The combination of claim 1 wherein said other roller series is carried on ramp means detachably interconnected with said one vehicle and projecting therefrom in overlying supported relation on said other vehicle.

References Cited in the file of this patent

UNITED STATES PATENTS

| | | |
|---|---|---|
| 1,148,531 | Oldham | Aug. 3, 1915 |
| 1,640,263 | Burgett | Aug. 23, 1927 |
| 1,658,770 | Murray et al. | Feb. 7, 1928 |
| 1,830,740 | Leech et al. | Nov. 3, 1931 |
| 1,926,613 | Yrarrazaval | Sept. 12, 1933 |
| 2,021,503 | Fildes | Nov. 19, 1935 |
| 2,056,179 | Fitch | Oct. 6, 1936 |
| 2,071,335 | Fitch | Feb. 23, 1937 |
| 2,081,178 | Kullerstrand | May 25, 1937 |
| 2,116,150 | Howie et al. | May 3, 1938 |
| 2,127,058 | Fitch | Aug. 16, 1938 |
| 2,287,068 | Shonnard | June 23, 1942 |
| 2,714,967 | Olsen | Aug. 9, 1955 |
| 2,849,129 | Likens | Aug. 26, 1958 |
| 2,926,797 | Decker | Mar. 1, 1960 |